United States Patent [19]
Lampinen et al.

[11] Patent Number: 6,158,238
[45] Date of Patent: Dec. 12, 2000

[54] ARRANGEMENT FOR TRANSFERRING HEATING AND COOLING POWER

[75] Inventors: Markku Lampinen, Espoo; Mauri Kontu, Kalanti, both of Finland

[73] Assignees: ABB Power Oy, Helsinki; Vahterus Oy, Kalanti, both of Finland

[21] Appl. No.: 09/254,257
[22] PCT Filed: Sep. 3, 1997
[86] PCT No.: PCT/FI97/00515
 § 371 Date: Mar. 31, 1999
 § 102(e) Date: Mar. 31, 1999
[87] PCT Pub. No.: WO98/10233
 PCT Pub. Date: Mar. 12, 1998

[30] Foreign Application Priority Data

Sep. 4, 1996 [FI] Finland ................................ 963470

[51] Int. Cl.[7] .............................. F25B 15/00; F28D 7/10
[52] U.S. Cl. ........................... 62/484; 62/485; 62/494; 165/140
[58] Field of Search ........................... 62/476, 484, 485, 62/494; 165/140

[56] References Cited

U.S. PATENT DOCUMENTS

| | | | |
|---|---|---|---|
| 3,990,263 | 11/1976 | Ainbinder et al. | 62/476 |
| 4,184,542 | 1/1980 | Sumitomo. | |
| 4,852,643 | 8/1989 | Mihailov. | |
| 5,282,507 | 2/1994 | Tongu et al. | 165/165 |
| 5,636,527 | 6/1997 | Christensen et al. | 62/476 |

FOREIGN PATENT DOCUMENTS

| | | |
|---|---|---|
| 95414 | 10/1995 | Finland. |
| 3124918 | 2/1983 | Germany. |
| 3202863 | 8/1983 | Germany. |
| 5677693 | 11/1979 | Japan. |
| 6488099 | 4/1989 | Japan. |
| 2-192593 | 7/1990 | Japan. |
| 158007 | 3/1988 | Norway. |
| 41764 | 3/1981 | Sweden. |
| 879202 | 11/1981 | U.S.S.R.. |
| 1815552 | 2/1991 | U.S.S.R.. |
| 1702125 | 12/1991 | U.S.S.R.. |
| 2028995 | 3/1980 | United Kingdom. |
| 2132327 | 7/1984 | United Kingdom. |
| 9109262 | 6/1991 | WIPO. |

*Primary Examiner*—William Doerrler
*Attorney, Agent, or Firm*—Dykema Gossett PLLC

[57] ABSTRACT

An apparatus for transferring heating and cooling power by means of two heat transfer media, wherein at least one of the heating media is arranged to be evaporated or condensed. To reduce the need for space, the apparatus includes a shell (3) inside which at least one plate heat exchanger (1,2) is arranged loosely, flow slots (19) of the heat exchanger being arranged to be completely or mainly open towards the shell (3) in such a manner that the evaporating or condensing heat transfer medium can flow to the plate heat exchanger or from the plate heat exchanger from different sides of the plate heat exchanger on the whole length of that slot (19) which is open.

11 Claims, 4 Drawing Sheets

ARRANGEMENT FOR TRANSFERRING HEATING AND COOLING POWER

BACKGROUND OF THE INVENTION

1. Field of the Invention

The invention relates to an arrangement (apparatus) for transferring heating and cooling power by means of two heat transfer heating media, in which arrangement at least one of the heat transfer media is arranged to be evaporated or condensed.

2. The Prior Art

Absorption aggregates have long been used for transferring thermal energy from one energy level to another, or in other words, for producing heating or cooling power on a useful temperature level from a source not on a useful level. The operation of absorption aggregates is based on that possible because specific absorption agents are capable of absorbing to themselves specific other agents at a higher temperature than the boiling point of the agent under the prevailing pressure. In other words, they are able to bind to liquid another vaporous agent at a temperature higher than the boiling point of the agent in question. These agents, i.e., agents forming an absorption pair, can be separated again from one another by raising the temperature, i.e., by boiling.

Today buildings are generally cooled by a cooling aggregate based on a compressor aggregate, the cooling aggregates being dispersed to places of use. Cooling power is produced in them by electricity. The proportion of the cooling of buildings in the consumption of electricity is now fairly important, e.g., in the Southern European countries the electricity consumption peaks in the summer. With regard to production, the consumption also occurs at an unfavourable time. The heat inevitably generated in connection with the production of electricity cannot be used for much else than production of hot tap water, and so it has to be condensed and supplied to waterways, e.g., by brine condensers or to air by cooling towers.

Cooling power could also be produced by waste heat produced in the production of electricity in absorption aggregates mentioned above, the best known of which are lithiumbromide/water and ammonia/water aggregates. The consumption of electricity and thus, e.g., emissions of $CO_2$ could be reduced with these aggregates, and the waste heat, which is now completely wasted, could be utilized by generating cooling power at a power plant and by distributing it with a pipe system to places of use in the same way as district heat at present, or by utilizing the present district heating network and by generating cooling power in smaller units specifically for each area or building. This has an advantageous effect, e.g., on servicing costs, which in the present, dispersed systems are high, and on reliability, on space utilization in buildings, etc.

Another way to reduce the consumption of electricity is to generate the required heat by solar collectors, the power derived from which is generally at its highest when the need for cooling is at its greatest. If the collector system is dimensioned by the amount of radiation and radiation times in spring/autumn to correspond to the consumption of tap water, there is a lot of extra capacity in mid-summer, which capacity could be used at least to cut the peak power.

Absorption cooling systems have not become common, however, due to high investment costs. Although the kWh price of the chill generated in this way is low as compared with the price of electricity, the number of hours of use is so small in those climatic zones where district heating systems have been built that the investment costs will not be covered. In Finland, for example, such systems have thus not been built. The majority of them exist in Japan, Korea and the U.S.

Another essential factor is the large size of the apparatuses operating on the absorption principle at present. The need for space is triple in comparison with a compressor aggregate, for example, which further raises costs.

The main reasons for the great need for space are heat exchangers connected to a low pressure prevailing in evaporator and absorption parts. If boiling, that is, the separation of the parts of the absorption pair from one another is to be done with district heating water whose temperature in Finland, for example, is generally about 70 to 75° C. in the summer, there is also a low pressure in the boiling and condensation parts. Low pressure vapour flowing in all parts of the absorption aggregate requires large flow paths, which increases the size of the apparatus and especially that of the heat exchangers.

The requirement of large flow paths has meant that it has not been possible to build absorption aggregates in district heating networks for ordinary boiling temperatures of 70 to 80° C. as the size of the aggregate, as well as the costs of the aggregate, will grow too much because of low pressure.

A high boiling temperature is particularly disadvantageous to the use of solar collectors as their power will fall considerably if the temperature of the heat exchange liquid rises.

The requirement of large flow paths has also resulted in that all the absorption aggregates on the market are built by using tube heat exchangers where the ratio of the area of the flow paths and temperature is great and can be selected according to the purpose of use by varying the pipe diameter. Their manufacture costs are, however, high as it is difficult to automatize manufacture, and the price/heat delivery surface-$m^2$ of the raw material, i.e., of the pipes is high. Furthermore, the raw material consumption/heat delivery surface-$m^2$ is high as well as the need for space/heat delivery surface-$m^2$.

Because of the above reasons, plate heat exchangers have in recent years almost replaced tube heat exchangers as liquid/liquid exchangers. The small need for space of the plate heat exchangers has the drawback that the flow paths of the heating medium especially at the corners of the exchanger are very narrow. Because of technical manufacturing reasons, they cannot be made to be very much larger either. Therefore, the plate heat exchanger is best suitable as a liquid/liquid exchanger and for clearly overpressure vapour. A considerably low pressure vapour does not simply have room to flow through narrow flow paths. This explains why plate heat exchangers have not been used in absorption aggregates.

For example, Finnish Patent Specification No. 95414 discloses a plate heat exchanger placed in a container to which a heat transfer medium is conveyed to flow directly to the slots between channel plates. The flowing area can be increased substantially in this way. This kind of a heat exchanger has been applied to the vaporization and condensation apparatus of Finnish Patent Specification No. 95414 where one of the heat transfer media will evaporate and the other condense as in an apparatus, for example, where salt-free water is produced of sea water. The area of the vapour flow path will thus be $$A = n \times s \times a,$$

where n=the number of slots between the channel plates s=the width of slots between the channel plates a=the length of a side of the exchanger.

The apparatus shown above is not, however, suitable for absorption aggregates, for example, where one of the heat transfer media will evaporate or condense while the other will stay in liquid form.

SUMMARY OF THE INVENTION

The object of the invention is to accomplish an arrangement (apparatus) with which the disadvantages of the prior art can be eliminated. This has been achieved by the arrangement of the invention that is characterized in that the arrangement comprises a shell inside which at least one plate heat exchanger is arranged loosely, flow slots of the exchanger being arranged to be completely or mainly, open towards the shell in such a manner that the evaporating or condensing heat transfer medium can flow to the plate heat exchanger or from the plate heat exchanger from different sides of the plate heat exchanger on the whole length of that slot which is open.

The primary advantage of the invention is that it enables the use of a plate heat exchanger on the low pressure level required by the absorption process. By means of the invention, the need for space can be essentially reduced and the apparatus can be made lighter. The invention also makes it possible to build large units by the plate heat exchanger technique. A further advantage of the invention is that costs can be lowered essentially with respect to prior art. By means of the invention, the construction can be simplified, the risk of leakage can be reduced and reliability can be increased. The invention also enables planning according to the available space.

In the solution of the invention, the vapour to be condensed is able to flow to the heat exchanger or the vaporized vapour from the exchanger on the whole length of its diameter. The flow area will be:

$$A = n \times s \times 2(a+b),$$

where n=the number of slots between the channel plates opening to the shell s=the width of slots between the channel plates a, b=the length of sides of the exchanger.

If the channel plates are preferably made into the shape of a square, that is, the size a=b, the flow surface is fourfold in comparison with the flow area of the apparatus of FI-95414. Furthermore, the distance the vapour flows between the channel plates will diminish by half, which will further lower flow resistance. This enables the use of a plate heat exchanger in an absorption aggregate where essentially lower pressures are present than in an apparatus producing salt-free water.

Another significant advantage will be attained by the loose placement. The flow rate of vapour restricts the length of the sides of the exchanger, or to be more exact, the ratio of the width of the slot between the channel plates and the side of the exchanger, which ratio should generally be more than 1:100. When the size of the channel plates cannot be enlarged, the only way in known apparatuses is to increase the number of channel plates, that is, extend the length of the plate pack. This is also restricted because of technical manufacturing problems, heat expansion and other such reasons. It would also be difficult to place the apparatus. Therefore the only way to build larger apparatuses is to build two or more separate heat exchangers connected in parallel.

In the solution of the invention, several exchangers can be positioned inside the same shell side by side, one on the other or one after the other, which gives totally new freedom for planning and leads to very effective space utilization. The costs of one large shell or container are, of course, also smaller than those of several small ones.

The loose and free placing of the heat exchangers inside the shell makes it also possible to reduce the size and costs of the aggregate essentially when it is understood that vapour can be conveyed in/taken out through openings placed at different points on the diameter.

The solution of the invention also makes it possible that the slots between the channel plates are made larger on the vapour side and/or expanding towards the diameter of the exchanger, which further improves the applicability as an absorption aggregate.

The size difference of slots or extension of the slot towards the diameter of the exchanger can be realized preferably by reducing the slot on the liquid side of the channel plates when it is understood that by using standard design plates, liquid can be supplied and discharged by two connectors instead of one. At the same time, the balance of liquid distribution and thus the heat-transfer coefficient will improve which is important in absorption aggregates because of small temperature differences, especially because considerably larger channel plates can be used in the arrangement of the invention than in prior art solutions.

The loose placement inside the shell makes it also easy to combine operations so that the parts on the same pressure level, that is, the evaporator and the absorption part and on the other hand, the boiler and condenser are placed one after the other inside a common tubular shell. The end plates of the exchanger can then operate as the end plates of the shell or they can rest on the end plates of the shell and the dividing plates of the chambers. This will essentially lower the costs, reduce the risk of leakage and so on.

A general reduction in the risk of leakage is of vital importance especially in absorption aggregates because of great pressure differences. Even small leakages cause corrosion and impair heat transfer as leakage air will collect on heat transfer surfaces. In the arrangement of the invention, there are clearly less both internal and external leakages than in prior art apparatuses.

In the following, the invention will be explained in more detail by means of prior art and various embodiments of the invention shown in the appended figures,

BRIEF DESCRIPTION OF THE PREFERRED EMBODIMENT

Figure 1:
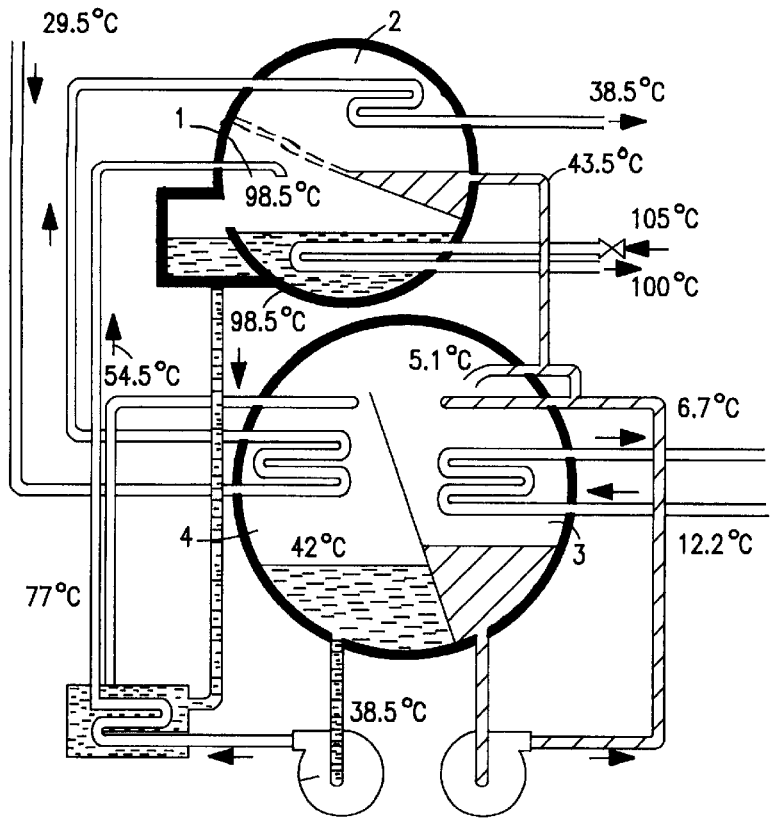
FIG. 1 is a schematic diagrammatic view of an ordinary 2-chamber lithiumbromide/water absorption aggregate.

FIG. 1 is a schematic view of an ordinary 2-chamber lithiumbromide/water absorption aggregate. It is also shown in FIG. 1 the temperatures prevailing in different points of the absorption aggregate in one application intended for cooling water.

The aggregate of FIG. 1 operates in principle in the following way. A boiler part 1 of the aggregate having a higher pressure has water and lithiumbromide as a solution. Water is boiled to separate it from the solution by hot water or vapour. The evaporated water is condensed to liquid in a condensation part 2 where it is cooled with condensing water which is extracted from the water cooler. The water condensed into liquid flows to a vaporizer part 3 where it is evaporated at a low pressure. Evaporation binds heat in which case the temperature indicated in FIG. 1 will be reached which is low enough to cool the cooling water of air conditioners, for example. Aqueous vapour flows to an absorption part 4 where it is absorbed again to liquid and pumped back to the boiler part 1. Liquefaction in the absorption part 4 takes place with condensing water by cooling. The cooling apparatus of the condensing water is not shown in FIG. 1. The water heated in the absorption aggregate is generally cooled in brine heat exchangers, cooling towers or other such apparatuses.

Figure 2:
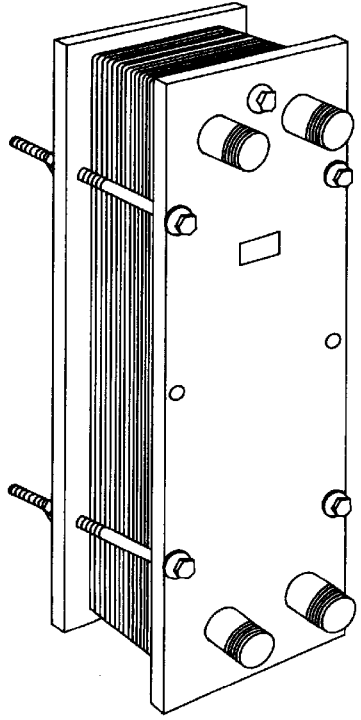
FIGS. 2, 3 and 4 is a schematic view of a typical plate heat exchanger.
Figure 3:
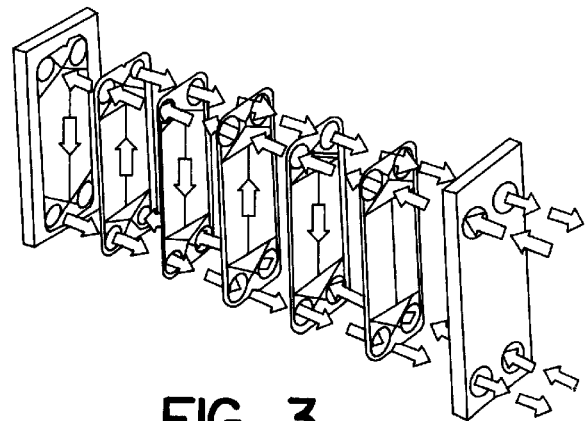
Figure 4:
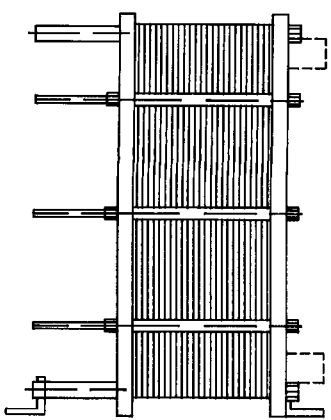

As was stated earlier, in recent years plate heat exchangers have almost replaced tube heat exchangers as liquid/liquid exchangers. As in FIGS. 2 to 4, for example, plate heat exchangers are produced of channel plates to which flow grooves for liquid are made with pressure tools. Every corner of each plate has openings. The plates are assembled by means of bolts and massive end plates into a pack, in which case the openings at the corners provide flow paths for liquids participating in heat transfer. A sealing encircles the edge of each plate, the sealing being formed at the slots in the corners so that liquid to be cooled will enter every other plate spacing and liquid to be heated, in turn, every other plate spacing. The channel plates can also be attached to one another for example by welding or by soldering instead of sealings and bolts.

Figure 5:
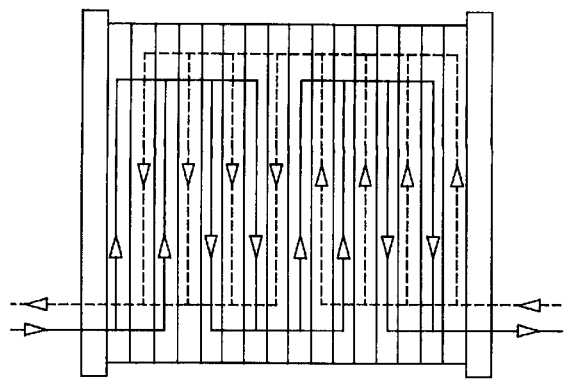
FIG. 5 is a schematic view of a flow diagram of a typical plate heat exchanger.

FIG. 5 illustrates a typical flow diagram of a plate heat exchanger. As can be seen in the flow diagram, it is possible to arrange various flow routes by sealings depending on mass flows, temperature differences, etc.

As stated above, it has not been possible to use plate heat exchangers before in connection with absorption aggregates as significantly low pressure vapour simply has not simply had space to flow through narrow flow paths.

Figure 6:
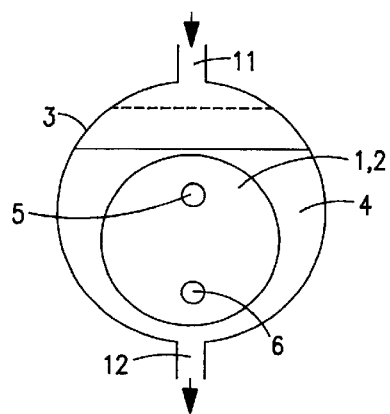
FIGS. 6 and 7 are schematic views of the arrangement of the invention viewed from different directions.
Figure 7:
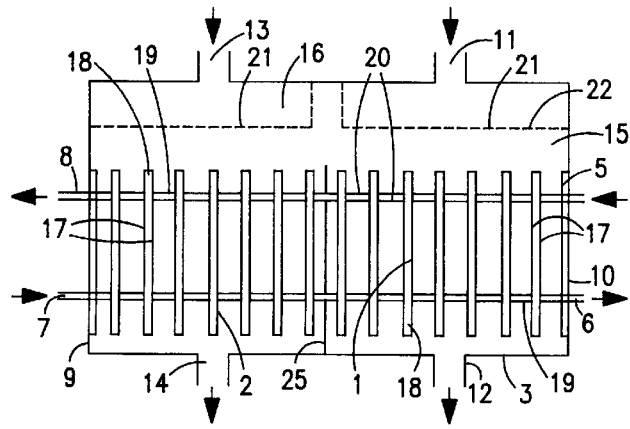

FIGS. 6 and 7 show by diagram the arrangement of the invention applied in connection with the absorption aggregates. FIGS. 6 and 7 show the evaporator and absorption parts 15 and 16 of the absorption aggregate simplified so that the figures show only the parts essential for the operation of the apparatus and for the understanding of the invention.

The plate heat exchangers 1 and 2 are placed inside the shell 3 loosely, preferably slightly eccentrically, for example, in such a manner that an expanding flow path 4 will be formed for vapour between the shell and the heat exchanger 1, 2. In the figures the shell 3 and the heat exchangers 1, 2 are shown to be round. They can be shaped as a rectangular or a square, the shell 3 can be round and the exchangers 1, 2 shaped as a square, and so on. Similarly, FIG. 7 shows only two connectors 5 and 6, and 7 and 8 for the exchangers 1 and 2. There may be 4 or even more of them. In FIG. 7 one end of the heat exchangers 1 and 2 rests on the end plate 9 and the other end is detached from a dividing plate 25 to illustrate alternative ways of placing. The dividing place 25 dividing the apparatus into evaporator and absorption parts 15 and 16 is attached to the shell 3. If there was no dividing plate 25, drawing 4 could show a separate evaporator part, for example, where the heat exchanger is divided into two parts 1 and 2.

The heat exchangers 1 and 2 are formed of channel plates 17 which are connected in pairs to one another at their outer edges in such a manner that there will be a closed flow space between them for a liquid heat transfer medium. The pairs of plates can be assembled as heat exchangers by means of bolts and tubular sealing pieces 20 according to the principle shown in FIG. 3, whereby inlet and output pipes 5, 6, 7 and 8 extending through the exchangers are provided for the heat transfer medium in liquid form. For the inflow and/or outflow of vapour, flow slots 19 connected at their edges will remain between channel plate pairs 17, the flow slots being open on the length of the whole outer diameter to the space confined by the ends 9 and 10 and the shell 3. The sealing pieces 20 can of course be replaced by metal tubes, by collars, etc., drawn onto the channel plates 17, which are connected by welding, soldering or any such manner known per se.

The arrangement of FIGS. 6 and 7 operates in principle in the following way. A strong underpressure has been absorbed to the space confined by the end plates 9 and 10 by a vacuum pump not shown in the figures. Water cooled in the condenser of the absorption aggregate flows to the connector 11 via an expansion valve. The condenser and the expansion valve have not been shown in the figure. Water pressure will lower in the expansion valve, in which case some of it will evaporate and the temperature of water will lower to correspond to the low pressure prevailing in the apparatus. Water/vapour mixture flows from the connector 11 to a dispersing plate 21 and via openings, nozzles, etc., therein to the heat exchanger 1. The purpose of the dispersing plate 21 is to divide water equally to all channel plates 17 of the heat exchanger 1 so that a thin even moisture film will be formed on them. This is generally ascertained so that a greater amount of water is supplied from the connector 11 than the exchanger 1 is able to evaporate. The excess water is collected from the bottom of the shell 3 via the connector 12 to a recycled water pump which returns it back to the pipe connected with the connector 11. The recycled water pump and pipe system are not shown in FIGS. 6, 7, but they are in principle as in FIG. 1.

The evaporation of water takes place in the exchanger 1 via the connector 5 by means of the heat transfer medium to be cooled conveyed to the flow slots 18 of the exchanger 1. The temperature of the heat transfer medium to be cooled is higher than the temperature of water carried via the connector 11. Evaporation binds heat so that the heat transfer medium flowing in the flow slots 18 will cool down. The cooled liquid is returned via the connector 6.

Vapour flows out by the slots 19 from the exchanger 1 and flows further to the absorption part 16 to which generally pre-cooled absorption agent solution, concentrated with a boiler is conveyed via a connector 13 and a dispersing plate 21. The solution will flow as a liquid film along the channel plates 17 and absorb to itself a proportion of aqueous vapour corresponding to the prevailing pressure and temperature. The evaporation temperature liberated and the excess temperature contained in the absorption agent is bound to the condensing liquid via the connector 7, the condensing liquid being warmed up when it flows in slots 18 and it is returned for cooling. The mixture of water and absorption agent is collected from the bottom of the shell 3 to the connector 14 and pumped back to a boiler which is not shown in FIGS. 6 and 7.

It is of course evident that instead of water, any known liquid can be used as heat transfer liquids, or vapour can be conveyed to the connector 5, for example.

The forming of liquid film on heat transfer surfaces takes place in the application of FIGS. 6 and 7 preferably by means of a dispersing plate 21. It is also possible to use other apparatuses intended for even distribution of liquid, such as centrifugal nozzles or other nozzles, draining mats, etc.

Figure 8:
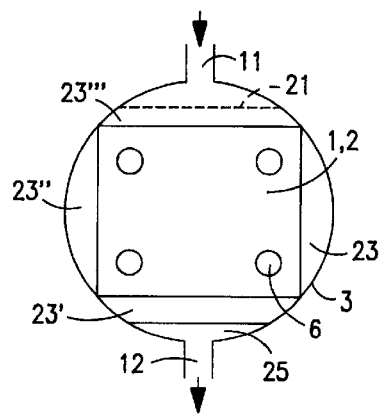
FIG. 8 illustrates a second embodiment of the arrangement of the invention.

A second embodiment of the invention is shown in FIG. 8. In order to save space, the shell 3 is made as small as possible and vapour is provided with flow paths 23, 23', 23" and 23'" on each side of the heat exchangers 1, 2. This requires that the division plate 25 can be made to be low as in FIG. 8. This application uses square-shaped heat exchangers 1, 2 which have two pairs of connector pipes.

Figure 9:
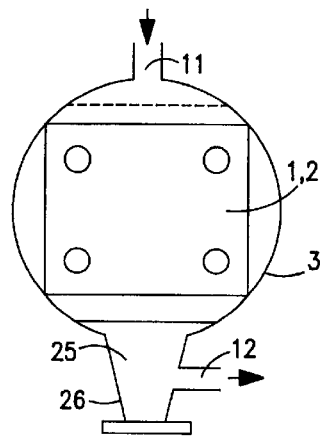
FIG. 9 illustrates a third embodiment of the arrangement of the invention.

If the dividing plate 25 is low, the liquids in the absorption part and the evaporator may get mixed. This risk can be eliminated by forming the lower part of the shell 3 into a liquid receiver 26 that can act as a support element of the aggregate at the same time. This application is shown in FIG. 9.

Figure 10:
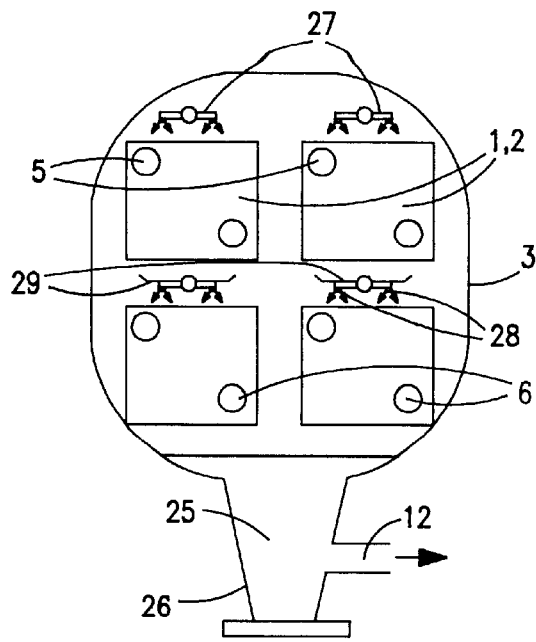
FIG. 10 illustrates a fourth embodiment of the arrangement of the invention.

Large units can be built as shown in FIG. 10 by placing several heat exchangers side by side, one on the other and/or one after the other inside one shell 3. In the application of FIG. 10, liquid films are formed on heat exchange surfaces of the exchangers by nozzles 28 fixed to nozzle pipe systems 27. Overflow liquid flowing from upper exchangers is collected in this application by water collecting chutes 29 and is directed past lower heat exchangers 1, 2 to the liquid receiver 26. It should be made sure that a sufficient distance will remain between the exchangers. If there are no more exchangers than one after the other, it generally has to be $$I \geq 4 \times n \times s,$$

where I=free distance between the exchangers n=the number of nozzle slots on the vapour side/exchanger s=the width of the slot between channel plates on the vapour side.

Especially in an application of this kind vapour flows can be improved by suitably formed guide plates that are, of course, known as such. As for leaks, pipes 5 and 6 are preferably connected before the end plate 10, but they can also be conveyed through it separately.

Figure 11:
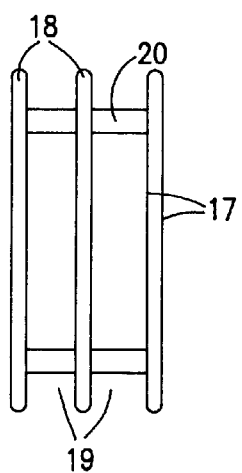
FIGS. 11 and 12 illustrate embodiments of one detail of the arrangement of the invention.

Flow conditions can be improved by making the flow slots 19 on the vapour side larger than the slots 18 on the liquid side. This can be realized for example as shown in FIG. 11 by making the sealing pieces 20 between the channel plates 17 longer than usual.

Figure 12:
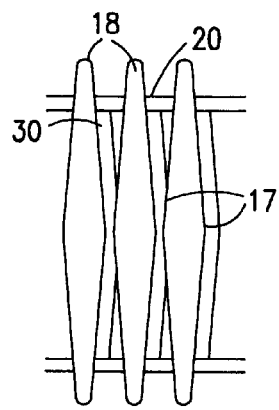
Figure 13:
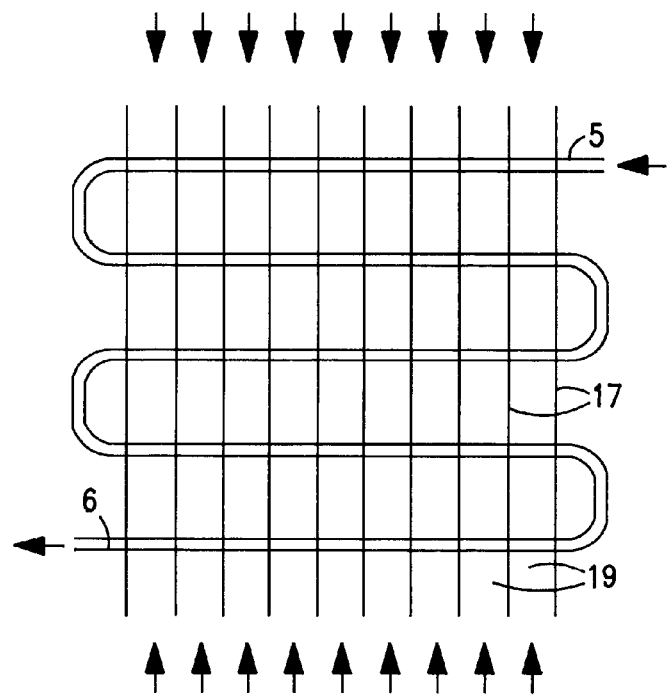
FIGS. 13 and 14 are schematic views of special applications of the basic idea of FIGS. 11 and 12.
Figure 14:
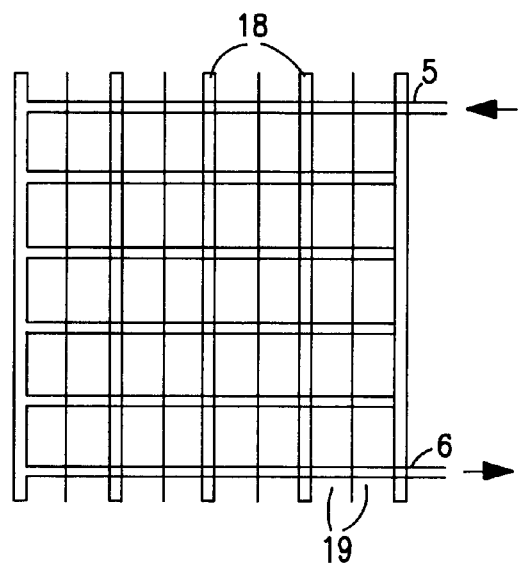

An especially advantageous embodiment is shown FIG. 12 where the channel plates 17 are made slightly conical in such a manner that the flow slot 19 on the vapour side extends outwards. It is then advantageous to provide the liquid side with chute feeders 30 to attain an even flow. The application of FIG. 12 is very advantageous for space utilization as almost the whole outer shell of the exchanger is the flow surface of vapour. It should be noted that in FIG. 12 the conical shape has been strongly exaggerated for the sake of clarity. In the application of FIG. 13, the basic idea of FIGS. 11 and 12 for enlarging flow paths has been carried to the extreme. In this application there are no flow slots 18 for the heat transfer medium in liquid form but vapour will flow in all the slots 19 of the channel plates. Generally this application requires that there are several connectors 5 in the plate pack, and liquid circulates several times through the pack as in FIG. 13 in order that the ratio of heat transfer surfaces on the liquid and vapour sides, as well as the flow areas of both heating media, will be suitable. The application shown above can also be realized as in FIG. 14 in such a manner that ⅔ of the slots 18 and 19, for example, open towards the shell 3.

Only evaporator and absorption parts have been discussed in the figures and above as the problems associated with them are the greatest because of the low pressure present there. The combination of a boiler and condenser part is in principle similar, for example as in FIG. 7. In large units, in particular, some or all parts of the absorption aggregate can also be built separately.

The invention has been explained above by way of example as an absorption aggregate application. The invention is in no way restricted to this application, but the invention can be varied quite freely within the scope of the claims. The invention thus includes all other applications where the ratio of volume flows of heating media is great, as well as all the constructive solutions known per se and so on.

What is claimed is:

1. An absorption apparatus for transferring heating and cooling power by means of two heat transfer media, at least one of the heat transfer media being evaporated or condensed, said absorption apparatus comprising an evaporator part, an absorption part, a boiler part and a condenser part, wherein at least one of said parts is formed by a shell containing a loosely arranged plate heat exchanger, said plate heat exchanger including flow slots which are completely or mainly open towards the shell so that evaporating or condensing heat transfer medium can flow to or from the plate heat exchanger from different sides of the plate heat exchanger on the whole length of the slots which are open.

2. An apparatus according to claim 1, wherein said evaporator part and said absorption part are provided by a first said plate heat exchanger in said shell, wherein said boiler part and said condenser part are provided by a second said plate heat exchanger in said shell, and wherein said first and second plate heat exchangers are placed in pairs one after the other inside the shell.

3. An apparatus according to claim 2, wherein a lower part of the shell includes a dividing plate dividing an interior of the shell in a longitudinal direction into an evaporator part and absorption part and/or into a boiler part and condenser part.

4. An apparatus according to claim 1, wherein a ratio of a width of said slots between the plates of the plate heat exchanger or plate heat exchangers and a side thereof is more than 1:100.

5. An apparatus according to claim 1, wherein a lower part of the shell includes means forming a liquid container.

6. An apparatus according to claim 5, wherein the liquid container extends beneath said shell to form a support element for the shell.

7. An apparatus according to claim 1, wherein several plate heat exchangers are placed inside the shell side by side, one on the other and or one after the other.

8. An apparatus according to claim 7, wherein the plate heat exchangers are spaced from one another a distance at least 4 times a width of the flow slots opening towards the shell multiplied by the number of flow slots.

9. An apparatus according to claim 1, wherein the flow slots of the plate heat exchanger opening inside the shell are larger than the flow slots closed towards the shell.

10. An apparatus according to claim 1, wherein the flow slots of the plate heat exchangers opening towards the shell widen completely or partly towards the shell.

11. An apparatus according to claim 1, wherein more than half of the flow paths between the channel plates of the plate heat exchanger are open towards the shell.

* * * * *